US011226008B2

(12) United States Patent
Finke et al.

(10) Patent No.: US 11,226,008 B2
(45) Date of Patent: Jan. 18, 2022

(54) SYSTEM AND METHOD FOR AXIALLY RETAINING TWO COAXIAL SHAFT COMPONENTS

(71) Applicant: Hamilton Sundstrand Corporation, Charlotte, NC (US)

(72) Inventors: Aaron M. Finke, Janesville, WI (US); Stephen Michael Bortoli, Roscoe, IL (US); Mark J. Franklin, Janesville, WI (US)

(73) Assignee: Hamilton Sundstrand Corporation, Charlotte, NC (US)

(*) Notice: Subject to any disclaimer, the term of this patent is extended or adjusted under 35 U.S.C. 154(b) by 393 days.

(21) Appl. No.: 16/242,105

(22) Filed: Jan. 8, 2019

(65) Prior Publication Data

US 2020/0217370 A1 Jul. 9, 2020

(51) Int. Cl.
*F16D 1/116* (2006.01)
*F16B 21/18* (2006.01)
*F16L 37/088* (2006.01)

(52) U.S. Cl.
CPC ............ *F16D 1/116* (2013.01); *F16B 21/18* (2013.01); *F16L 37/088* (2013.01)

(58) Field of Classification Search
CPC ........ F16D 1/116; F16B 21/18; F16B 21/183; F16B 21/186; Y10T 403/7033; Y10T 403/7061; Y10T 403/7176; F01D 5/025; F01D 5/026; F01D 5/066
See application file for complete search history.

(56) References Cited

U.S. PATENT DOCUMENTS

| 472,342 | A | * | 4/1892 | Draudt | ................ F16L 37/0885 |
| | | | | | 285/317 |
| 2,491,306 | A | * | 12/1949 | Feitl | ...................... F16B 21/186 |
| | | | | | 411/518 |
| 2,821,418 | A | * | 1/1958 | Schacr | ...................... F02C 6/12 |
| | | | | | 403/254 |

(Continued)

FOREIGN PATENT DOCUMENTS

| EP | 1681477 A1 | * | 7/2006 | ............. F16B 21/18 |
| EP | 1681477 A1 | | 7/2006 | |

OTHER PUBLICATIONS

Extended European Search Report dated May 20, 2020, issued during the prosecution of European Patent Application No. EP 19210052.7.

*Primary Examiner* — Josh Skroupa
*Assistant Examiner* — Alexus Camero
(74) *Attorney, Agent, or Firm* — Locke Lord LLP; Joshua L. Jones; Scott D. Wofsy (57) ABSTRACT

A system for axially retaining two coaxial components includes an inner component having an annular compression groove formed in a radially outer surface thereof, an outer component having an annular engagement groove formed in a radially inner surface thereof, and a split retaining ring installed in the annular compression groove of the inner component, wherein the split retaining ring is adapted for movement between a radially compressed condition to facilitate axial engagement of the inner component within the outer component and a radially expanded condition to facilitate radial engagement of the split retaining ring in the annular engagement groove of the outer component, so that the inner and outer components are axially locked together.

14 Claims, 6 Drawing Sheets

(56) References Cited

U.S. PATENT DOCUMENTS

| | | | | |
|---|---|---|---|---|
| 2,886,355 | A * | 5/1959 | Wurzel | F16B 21/183 403/326 |
| 3,151,891 | A * | 10/1964 | Sanders | F16L 37/0885 285/110 |
| 3,523,701 | A * | 8/1970 | Graham | F16B 21/18 285/130.1 |
| 4,124,318 | A * | 11/1978 | Sagady | F16B 21/18 403/14 |
| 4,136,982 | A * | 1/1979 | Sagady | F16B 21/18 403/108 |
| 4,966,488 | A * | 10/1990 | Mayhew | F16B 21/183 403/135 |
| 5,049,158 | A * | 9/1991 | Engelhardt | A61F 2/34 623/22.25 |
| 5,098,241 | A * | 3/1992 | Aldridge | F16L 37/0885 411/433 |
| 5,417,613 | A * | 5/1995 | Aiken | F16B 21/18 464/130 |
| 6,354,952 | B1 * | 3/2002 | Boulton | B60B 27/00 464/145 |
| 6,561,720 | B2 * | 5/2003 | Wirth | F16B 21/183 285/321 |
| 6,582,151 | B2 * | 6/2003 | Hopson | F16D 1/0894 403/359.5 |
| 6,739,422 | B2 * | 5/2004 | Krude | B60B 27/00 180/256 |
| 7,568,567 | B2 * | 8/2009 | Chen | F16D 1/116 192/30 R |
| 7,722,089 | B2 * | 5/2010 | Nauer | F16L 37/0885 285/321 |
| 7,946,374 | B2 * | 5/2011 | Kofuji | F16D 1/10 180/226 |
| 8,491,267 | B2 * | 7/2013 | Glasspoole | F01D 5/026 416/221 |
| 8,684,696 | B2 * | 4/2014 | Ress, Jr. | F01D 5/025 416/198 A |
| 8,864,590 | B2 | 10/2014 | Sugiyama et al. | |
| 8,870,489 | B2 * | 10/2014 | Langer | F16D 1/108 403/359.5 |
| 9,121,533 | B2 | 9/2015 | Kahle et al. | |
| 9,409,442 | B2 * | 8/2016 | Nollenberger | F16C 35/073 |
| 10,883,545 | B2 * | 1/2021 | Sugiyama | B25B 27/205 |
| 2006/0233479 | A1 | 10/2006 | Bouiller et al. | |
| 2006/0257228 | A1 * | 11/2006 | Jacob | F16B 21/186 411/147 |
| 2012/0076657 | A1 | 3/2012 | Ress, Jr. | |
| 2012/0308293 | A1 | 12/2012 | Yamakawa | |
| 2015/0135510 | A1 * | 5/2015 | Agarwal | F16B 39/32 29/456 |
| 2018/0320742 | A1 * | 11/2018 | Hopson | F16B 21/18 |

* cited by examiner

SYSTEM AND METHOD FOR AXIALLY RETAINING TWO COAXIAL SHAFT COMPONENTS

BACKGROUND OF THE INVENTION

1. Field of the Invention

The subject invention is directed to a method of axial shaft retention, and more particularly, to a system and method for axially retaining two coaxial shaft components in the transmission system of a low spool generator of a gas turbine engine used in aerospace applications.

2. Description of Related Art

There are various prior art systems and methods that have been used to interconnect two shaft components that are configured to rotate about a common center line, while preventing the relative axial movement of the two components.

Such systems and methods often involve the use of bolted joints, threaded connections, or mechanisms for clamping the two components together across the common center line. These prior art systems and methods are typically not easily disassembled, and they are often costly and add weight to the overall assembly of which they are a part.

It would be beneficial therefore to provide a system and method for connecting two coaxial shaft components together in a manner that allows for simple assembly and disassembly of the components, as well as providing a low cost and light weight solution. Such a system and method would be particularly useful in the transmission system of a low spool generator of a gas turbine engine used in aerospace applications.

SUMMARY OF THE DISCLOSURE

The subject invention is directed to a new and useful axial shaft retention method for two coaxial shaft components, and more particularly, to a system and method for axially retaining two coaxial shaft components located in the transmission system of a low spool generator of a gas turbine engine used in aerospace applications.

The system includes an inner component having an annular compression groove formed in a radially outer surface thereof, an outer component having an annular engagement groove formed in a radially inner surface thereof, and a split retaining ring installed in the annular compression groove of the inner component, wherein the split retaining ring is adapted for movement between a radially compressed condition to facilitate axial engagement of the inner component within the outer component and a radially expanded condition to facilitate radial engagement of the split retaining ring in the annular engagement groove of the outer component, so that the inner and outer components are axially locked together.

Preferably, the inner component is an inner shaft that includes an annular engagement flange, wherein the annular compression groove is formed in a radially outer surface of the annular engagement flange of the inner shaft, and the outer component is an outer shaft that includes an annular reception flange, wherein the annular engagement groove is formed in a radially inner surface of the annular reception flange of the outer shaft. The annular reception flange of the outer shaft is preferably dimensioned and configured to axially receive the annular engagement flange of the inner shaft.

Preferably, an insertion slot is formed in a leading edge of the annular reception flange of the outer shaft, and the insertion slot opens into a retention slot, wherein the retention slot is axially aligned with the annular engagement groove of the outer shaft, and the retention slot has a length that is greater than the length of the insertion slot.

Preferably, the split retaining ring has a pair of spaced apart outwardly extending ears. The spaced apart ears of the split retaining ring are configured to be approximated toward one another to pass axially through the insertion slot into the annular reception flange of the outer shaft, when the split retaining ring is in the radially inwardly compressed condition. The split retaining ring is configured to radially outwardly expand into the retention slot in the annular reception flange of the outer shaft and the spaced apart ears of the split retaining ring are configured to be retained in the retention slot, when the split retaining ring is in the radially expanded condition.

The subject invention is also directed to a system for preventing relative axial movement of two rotating coaxial shafts, which includes an inner shaft having an annular engagement flange with an annular compression groove formed in a radially outer surface thereof, and an outer shaft having an annular reception flange dimensioned to axially receive the annular engagement flange of the inner shaft, wherein the annular reception flange has an annular engagement groove formed in a radially inner surface thereof, and an insertion slot is formed in a leading edge of the annular engagement flange, which opens into a retention slot.

The system further includes a split retaining ring installed in the annular compression groove of the inner shaft and having a pair of spaced apart outwardly extending ears. The split retaining ring is adapted for movement between a first position in which the split retaining ring is radially compressed within the annular compression groove of the inner shaft and the spaced apart ears are approximated toward one another to pass axially through the insertion slot into the retention slot and a second position in which the split retaining ring is radially expanded into the annular engagement groove of the outer shaft and the spaced apart ears are retained in the retention slot, so that the inner and outer shafts are axially locked together. Preferably, the retention slot is axially aligned with the annular engagement groove, and the retention slot has a length that is greater than the length of the insertion slot.

The subject invention is also directed to a method for preventing relative axial movement of two rotating coaxial components, which includes the steps of installing a split retaining ring in an annular compression groove formed in a radially outer surface of an inner component, radially compressing the split retaining ring within the annular compression groove of the inner component, axially inserting the inner component into an outer component, and permitting the split retaining ring to radially expand into an annular engagement groove formed in a radially inner surface of the outer component to axially lock the inner and outer components together.

These and other features of the subject invention will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those having ordinary skill in the art will readily understand how to make and use the shaft retention system and method of the subject invention without undue experimentation, preferred embodiments thereof will be described in detail herein below with reference to the figures wherein.

DETAILED DESCRIPTION OF THE PREFERRED EMBODIMENTS

Figure 1:
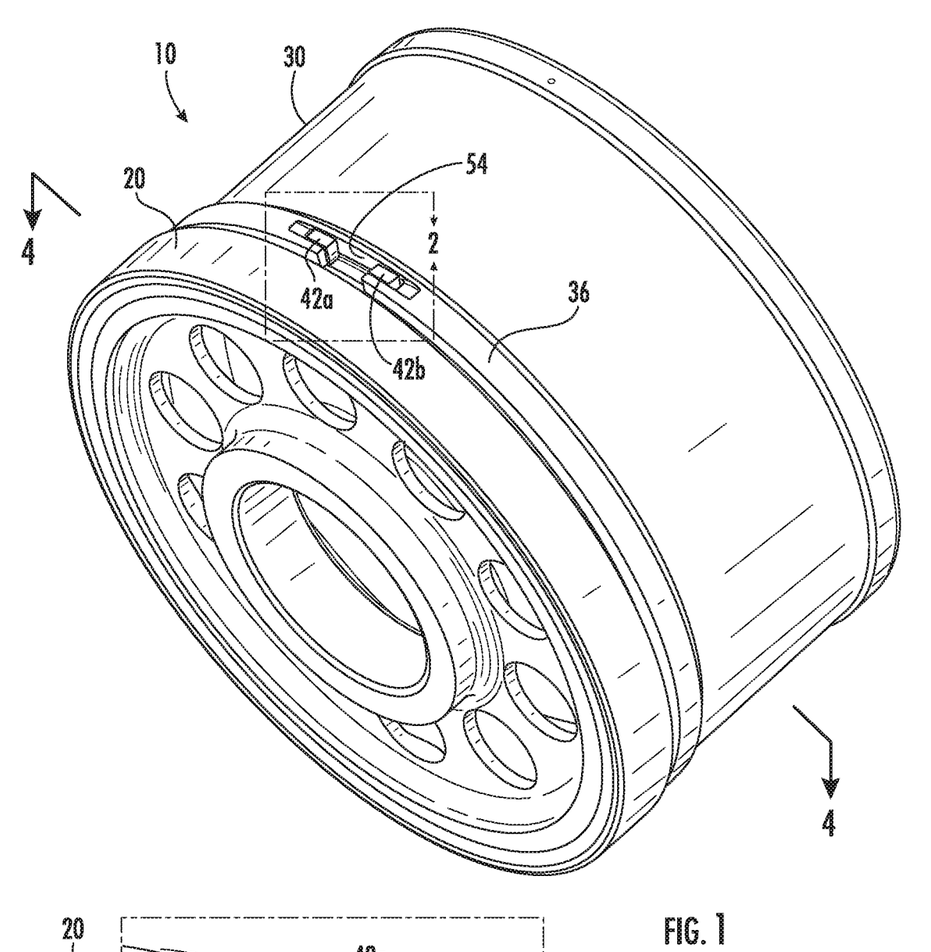
FIG. 1 is a perspective view of two rotatable coaxial components axially retained together using the axial retention system and method of the subject invention.
Figure 2:
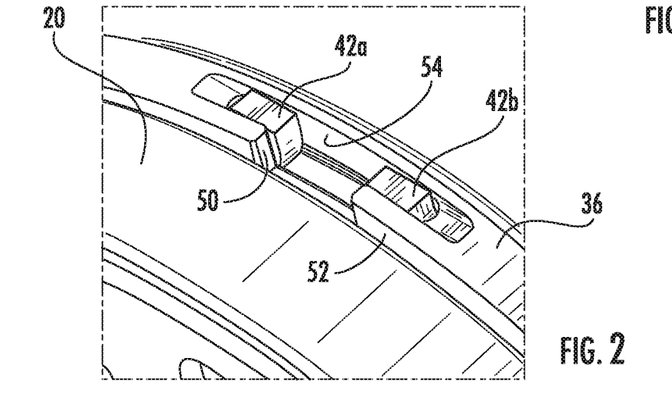
FIG. 2 is an enlarged localized view of the retention features shown in FIG. 1.
Figure 3:
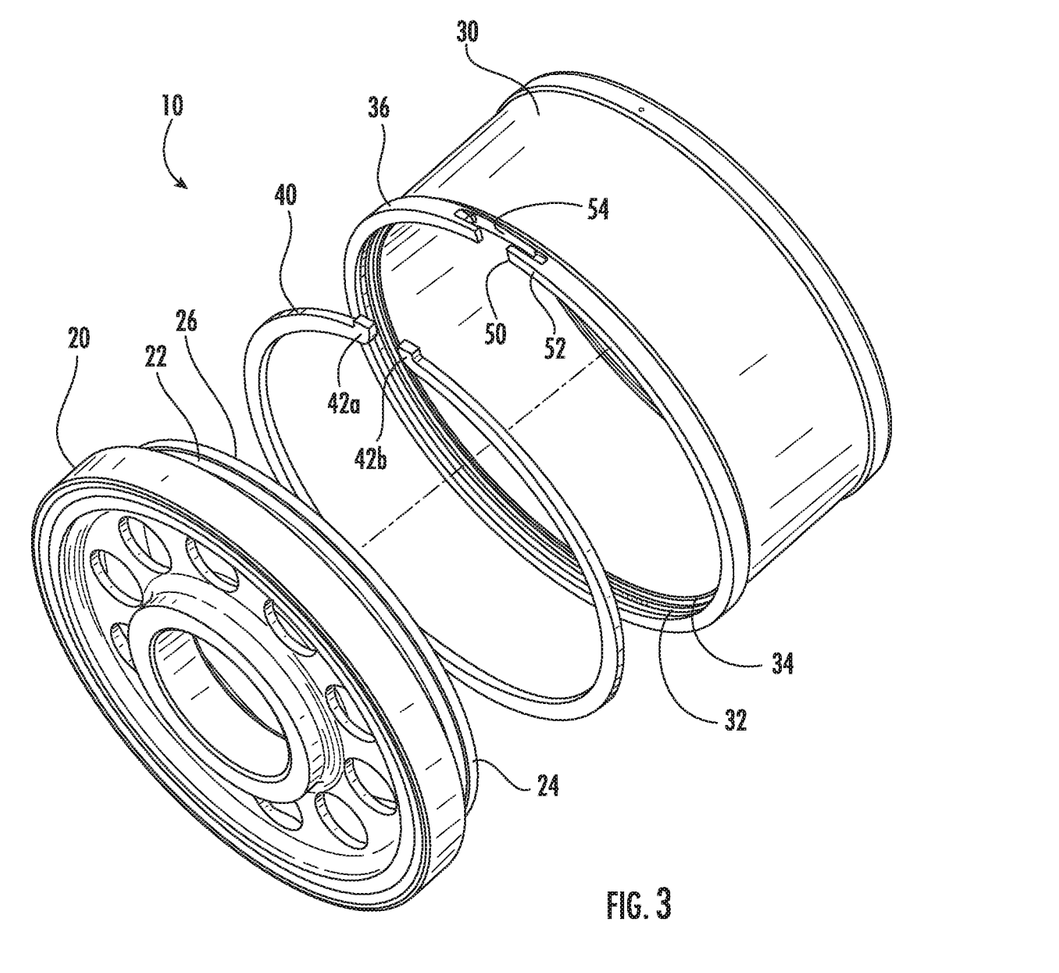
FIG. 3 is an exploded perspective view of the axial retention system of the subject invention, with parts separated for ease of illustration.
Figure 4:
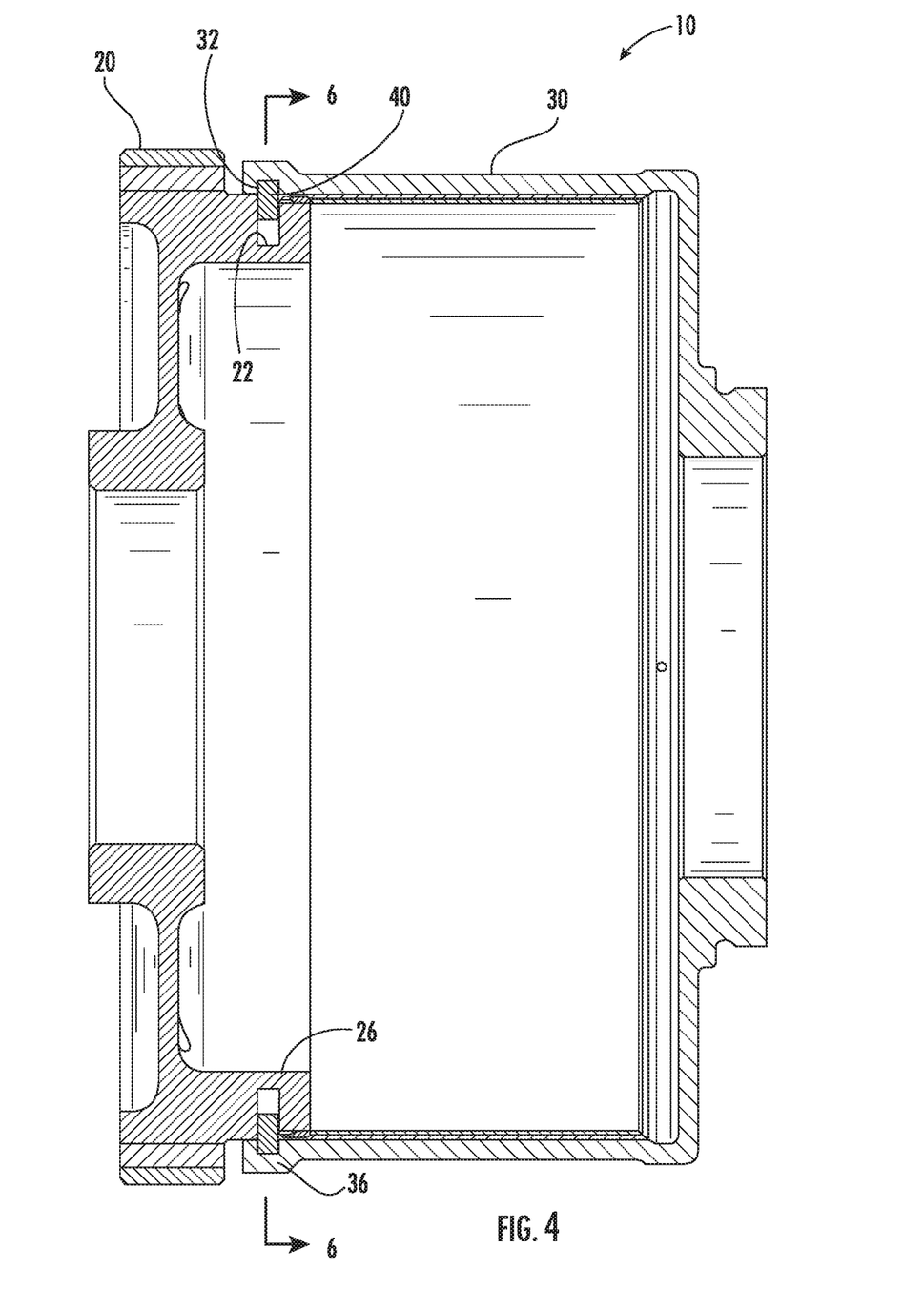
FIG. 4 is a cross-sectional view of the axial retention system of the subject invention taken along 4-4 of FIG. 1.
Figure 5:
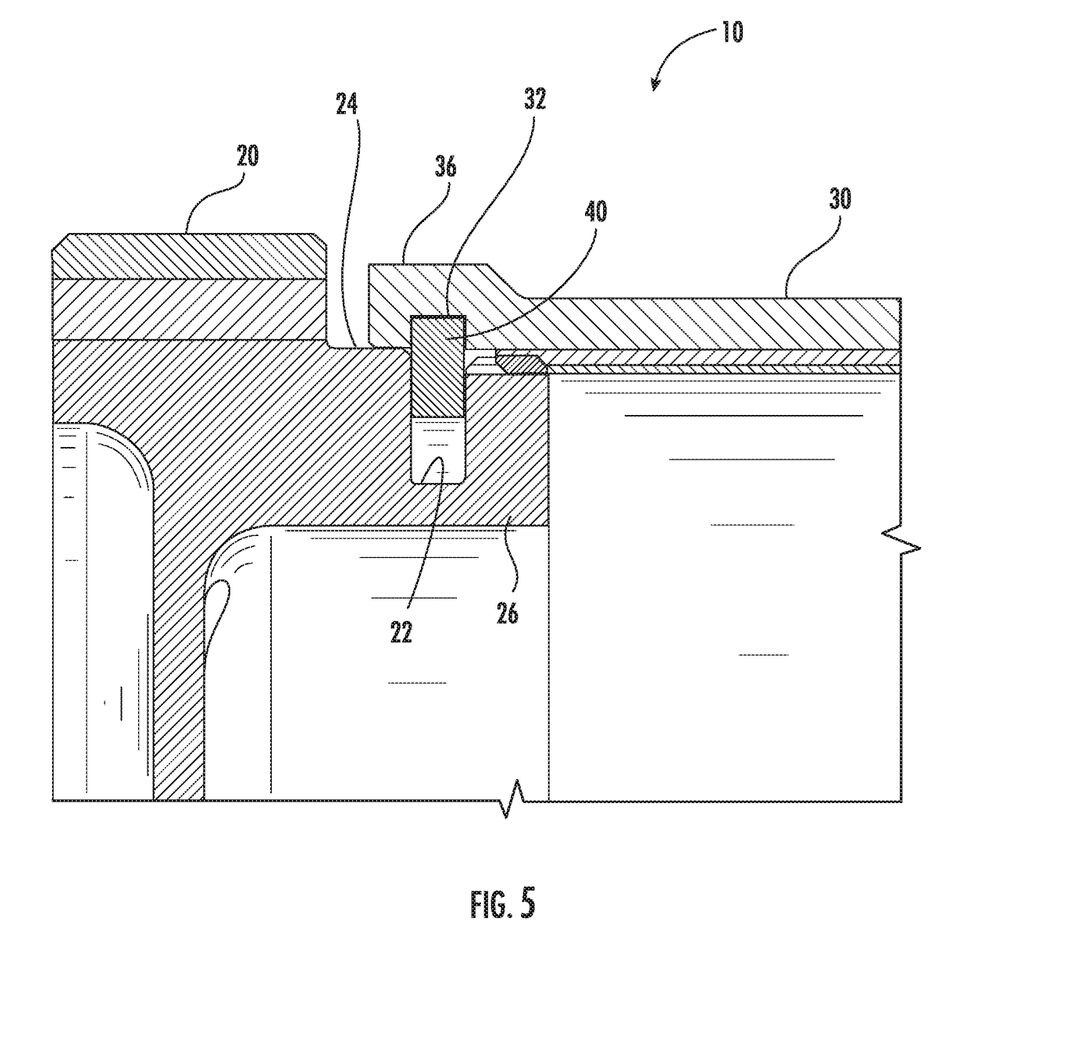
FIG. 5 is an enlarged localized view taken from FIG. 4.
Figure 6:
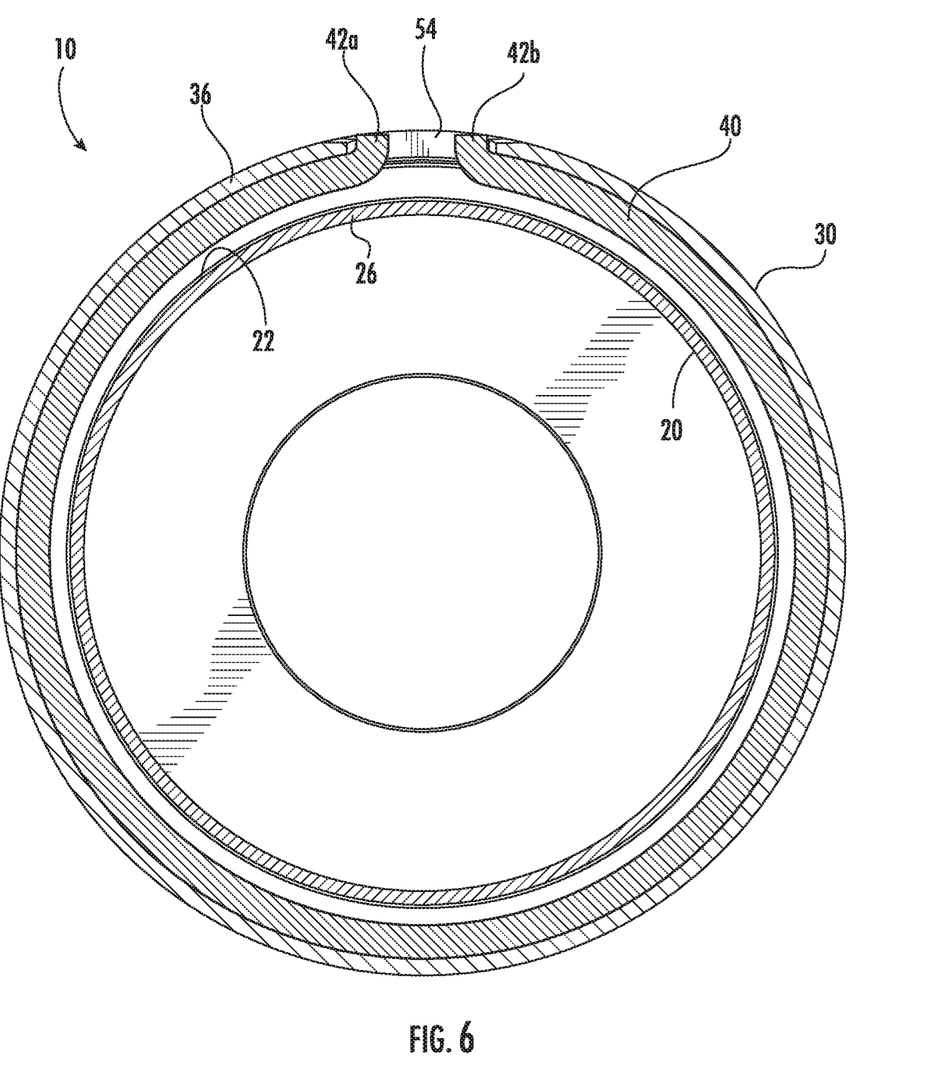
FIG. 6 is a cross-sectional view taken along line 6-6 of FIG. 4.
Figure 7:
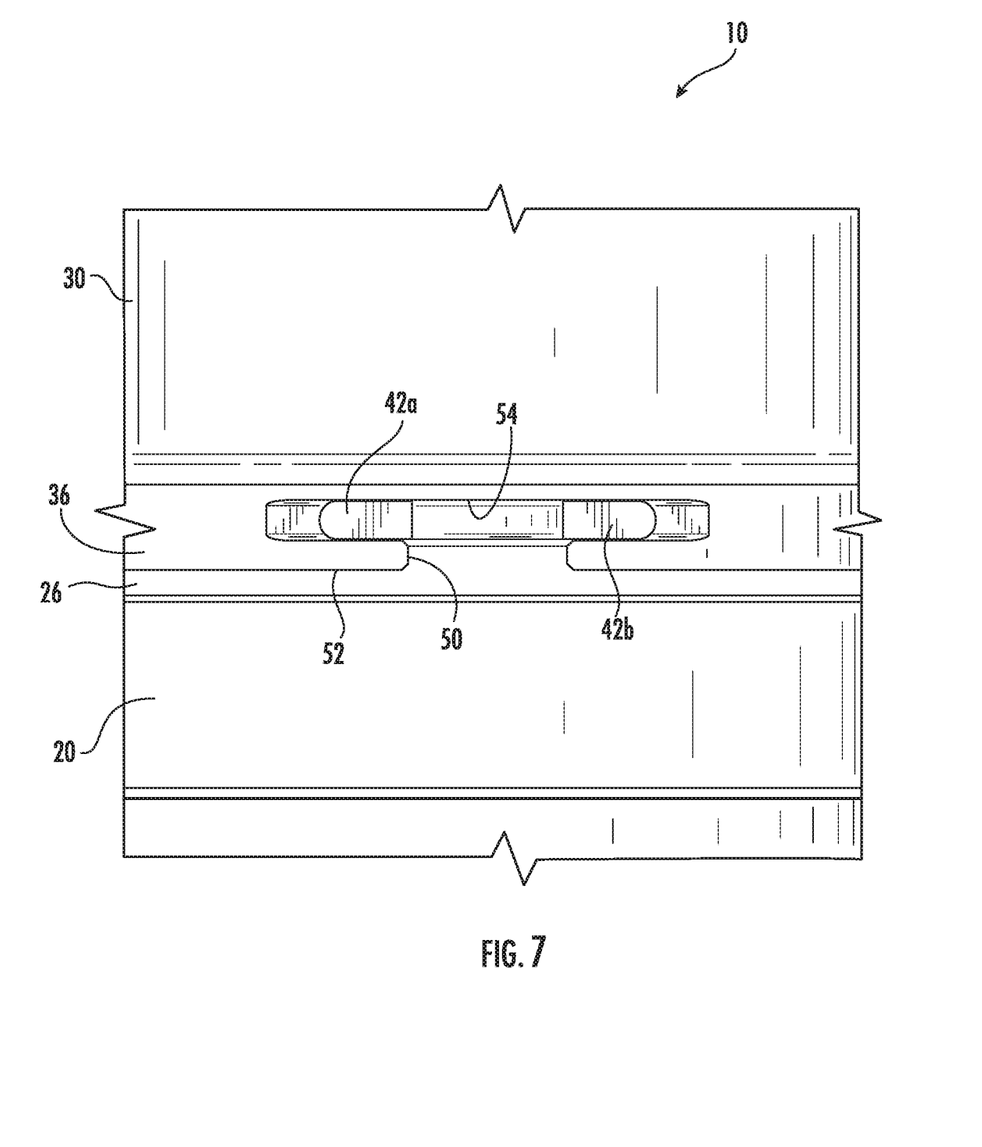
FIG. 7 is an enlarged top plan view of the retention features shown in FIG. 2

Referring now to the drawings wherein like reference numerals identify similar structural elements or features of the subject invention, there is illustrated in FIG. 1 a new and useful system which is adapted and configured to connect two coaxial components rotating about a common axis or centerline and thereby prevent the relative axial movement of the two components. More particularly, the subject invention is directed to system 10 for axially retaining two coaxial shaft components located in the transmission system of a low spool generator of a gas turbine engine used in aerospace applications.

The shaft retention system 10 of the subject invention has three primary components, which include an inner shaft component 20, an outer shaft component 30 and a split retaining ring 40 for retaining the inner and outer shaft components together. The inner shaft component 20 has an annular compression groove 22 formed in a radially outer surface 24 thereof. More particularly, the inner shaft component 20 has an annular engagement flange 26, wherein the annular compression groove 22 is formed.

The outer shaft component 30 has an annular engagement groove 32 formed in a radially inner surface 34 thereof. More particularly, the outer shaft component 30 has an annular reception flange 36, wherein the annular engagement groove 32 is formed. The annular reception flange 36 of the outer shaft component 30 is preferably dimensioned and configured to axially receive the annular engagement flange 26 of the inner shaft component 20.

The split retaining ring 40 is preferably formed from spring steel, copper beryllium alloy, or a similar metal, and it is installed in the annular compression groove 22 of the inner component 20. The split retaining ring 40 is adapted and configured for movement between a radially compressed condition to facilitate the axial engagement of the annular engagement flange 26 of inner shaft component 20 within the annular reception flange 36 of the outer shaft component 30, and a radially expanded condition to facilitate radial engagement of the split retaining ring 40 in the annular engagement grove 32 of the outer shaft component 30, so that the inner and outer shaft components 20 and 30 are axially locked together.

An insertion slot 50 is formed in a leading edge 52 of the annular reception flange 36 of the outer shaft component 30, and the insertion slot 50 opens into a retention slot 54. The arcuate retention slot 54 is axially aligned with the annular engagement groove 32 of the outer shaft component 30. And, the retention slot 54 has a length that is greater than the length of the arcuate insertion slot 50.

The split retaining ring 40 has a pair of spaced apart outwardly extending ears 42a and 42b. The spaced apart ears 42a and 42b of the split retaining ring 40 are adapted to be approximated toward one another so as to pass axially through the insertion slot 50 into the annular reception flange 36 of the outer shaft component, when the split retaining ring 40 is in the radially compressed condition.

The split retaining ring 40 is configured to be radially expanded within the retention slot 54 in the annular reception flange 36 of the outer shaft component 30 so that the spaced apart ears 42a and 42b of the split retaining ring 40 are retained in the retention slot 54, when the split retaining ring 40 is in the radially expanded condition.

In sum, a method is disclosed for connecting two shaft components 20 and 30 rotating about a common centerline or axis, while preventing the relative axial movement of the two components. This method includes the step of installing a split retaining ring 40 in an annular compression groove 22 formed in a radially outer surface 24 of the inner shaft component 20, and then radially compressing the split retaining ring 40 within the annular compression groove 22 of the inner shaft component 20.

The method further includes the step of axially inserting the inner shaft component 20 into the outer shaft component 30, and then permitting the split retaining ring 40 to radially expand into an annular engagement groove 32 formed in a radially inner surface 34 of the outer shaft component 30, so as to axially lock the inner and outer shaft components 20 and 30 together.

While the subject disclosure has been shown and described with reference to preferred embodiments, those skilled in the art will readily appreciate that changes and/or modifications may be made thereto without departing from the scope of the subject disclosure.

What is claimed is:

1. A system for axially retaining two coaxial components, comprising:
   a) an inner component having an annular compression groove formed in a radially outer surface thereof, said inner component being hollow and including a smaller radius through hole at one end transitioning to a larger radius through hole at a second end;
   b) an outer component having an annular engagement groove formed in a radially inner surface thereof, said outer component being hollow and including a smaller radius through hole at one end transitioning to a larger radius through hole at a second end; and
   c) a split retaining ring installed in the annular compression groove of the inner component, wherein the split retaining ring is adapted for movement between a radially compressed condition to facilitate axial engagement of the inner component within the outer component and a radially expanded condition to facilitate radial engagement of the split retaining ring in the annular engagement groove of the outer component, so that the inner and outer components are axially locked together, wherein the split retaining ring has a pair of spaced apart outwardly extending ears, and wherein with the inner and outer components locked together, the larger radius through hole of the inner component is positioned within the larger radius through hole of the outer component.

2. A system as recited in claim 1, wherein the inner component is an inner shaft that includes an annular engagement flange, and wherein the annular compression groove is formed in a radially outer surface of the annular engagement flange of the inner shaft.

3. A system as recited in claim 2, wherein the outer component is an outer shaft that includes an annular reception flange, and wherein the annular engagement groove is formed in a radially inner surface of the annular reception flange of the outer shaft.

4. A system as recited in claim 3, wherein the annular reception flange of the outer shaft is dimensioned and configured to axially receive the annular engagement flange of the inner shaft.

5. A system as recited in claim 4, wherein an insertion slot is formed in a leading edge of the annular reception flange of the outer shaft.

6. A system as recited in claim 5, wherein the insertion slot opens into a retention slot.

7. A system as recited in claim 6, wherein the retention slot is axially aligned with the annular engagement groove of the outer shaft.

8. A system as recited in claim 7, wherein the retention slot has a length that is greater than a length of the insertion slot.

9. A system as recited in claim 8, wherein the spaced apart ears of the split retaining ring are approximated toward one another to pass axially through the insertion slot into the annular retention flange of the outer shaft, when the split retaining ring is in the radially compressed condition.

10. A system as recited in claim 9, wherein the split retaining ring is radially expanded into the retention slot in the annular reception flange of the outer shaft and the spaced apart ears of the split retaining ring are retained in the retention slot, when the split retaining ring is in the radially expanded condition.

11. A system for axially retaining two coaxial shafts, comprising:
a) an inner shaft including an annular engagement flange having an annular compression groove formed in a radially outer surface thereof, said inner shaft being hollow and including a smaller radius through hole at one end transitioning to a larger radius through hole at a second end;
b) an outer shaft including an annular reception flange dimensioned to axially receive the annular engagement flange of the inner shaft, the annular reception flange having an annular engagement groove formed in a radially inner surface thereof, wherein an insertion slot is formed in a leading edge of the annular engagement flange, which opens into a retention slot, said outer shaft being hollow and including a smaller radius through hole at one end transitioning to a larger radius through hole at a second end; and
c) a split retaining ring installed in the annular compression groove of the inner shaft and having a pair of spaced apart outwardly extending ears, wherein the split retaining ring is adapted for movement between a first position in which the split retaining ring is radially compressed within the annular compression groove of the inner shaft and the spaced apart ears are approximated toward one another to pass axially through the insertion slot into the retention slot, and a second position in which the split retaining ring is radially expanded into the annular engagement groove of the outer shaft and the spaced apart ears are retained in the retention slot, so that the inner and outer shafts are axially locked together, wherein with the inner and outer shafts locked together, the larger radius through hole of the inner shaft is positioned within the larger radius through hole of the outer shaft.

12. A system as recited in claim 11, wherein the retention slot is axially aligned with the annular engagement groove.

13. A system as recited in claim 11, wherein the retention slot has a length that is greater than a length of the insertion slot.

14. A method for preventing relative axial movement of two rotating coaxial components, comprising:
a) installing a split retaining ring in an annular compression groove formed in a radially outer surface of an inner component, said inner component being hollow and including a smaller radius through hole at one end transitioning to a larger radius through hole at a second end, wherein the split retaining ring has a pair of spaced apart outwardly extending ears;
b) radially compressing the split retaining ring within the annular compression groove of the inner component;
c) axially inserting the inner component into an outer component, said outer component being hollow and including a smaller radius through hole at one end transitioning to a larger radius through hole at a second end; and
d) permitting the split retaining ring to radially expand into an annular engagement groove formed in a radially inner surface of the outer component to axially lock the inner and outer components together, wherein with the inner and outer components locked together, the larger radius through hole of the inner component is positioned within the larger radius through hole of the outer component.

* * * * *